United States Patent [19]

Pollack et al.

[11] Patent Number: 4,925,219
[45] Date of Patent: May 15, 1990

[54] FLUID SWIVEL ASSEMBLY

[76] Inventors: Jack Pollack, 18709 Cohasset St., Reseda, Calif. 91335; Tarlochan S. Mann, 8444 Geyser Ave., Northridge, Calif. 91324

[21] Appl. No.: 222,568

[22] Filed: Jul. 21, 1988

[51] Int. Cl.$^5$ .............................................. F16L 17/02
[52] U.S. Cl. ....................................... 285/95; 285/351; 285/98; 285/281; 277/24; 277/206 R
[58] Field of Search ........................ 285/93, 94, 95, 96, 285/97, 98, 111, 112, 281, 134, 136, 351; 277/206 R, 123, 24, 3, 27, 188

[56] References Cited

U.S. PATENT DOCUMENTS

| | | | |
|---|---|---|---|
| 4,561,679 | 12/1985 | Choate | 285/95 |
| 4,647,076 | 3/1987 | Pollack et al. | 285/95 |
| 4,647,077 | 3/1987 | Ethridge et al. | 285/98 |
| 4,662,657 | 5/1987 | Harvey et al. | 285/136 X |
| 4,669,758 | 6/1987 | Feller et al. | 285/136 X |
| 4,756,559 | 7/1988 | Shimada et al. | 285/136 |
| 4,781,404 | 11/1988 | Tharp et al. | 285/136 X |
| 4,819,966 | 4/1989 | Gibb | 285/136 X |
| 4,828,292 | 5/1989 | Jansen | 285/93 |

FOREIGN PATENT DOCUMENTS 8600972 2/1986 World Int. Prop. O. .......... 285/136

Primary Examiner—Eric K. Nicholson
Attorney, Agent, or Firm—Freilich, Hornbaker & Rosen

[57] ABSTRACT

A fluid swivel is described, of a type which forms an annular chamber and a pair of gap passages extending in opposite directions from the chamber to the environment, with face seals along each gap passage. The fluid swivel uses a minimum number of parts and minimizes entrapment of sediment in the isolation seal lying between the chamber and the closest pressure seal. The high pressure ends of the primary and secondary seals in each gap passage, face in opposite radial directions, and the low pressure end of each secondary seal lies about as far from the axis of rotation of the swivel as the low pressure end of the corresponding primary seal. The gap passage includes a tapered portion leading from the annular chamber to the isolation seal, to enable circulation of fluid up to the isolation seal to minimize the buildup of sediment.

9 Claims, 2 Drawing Sheets

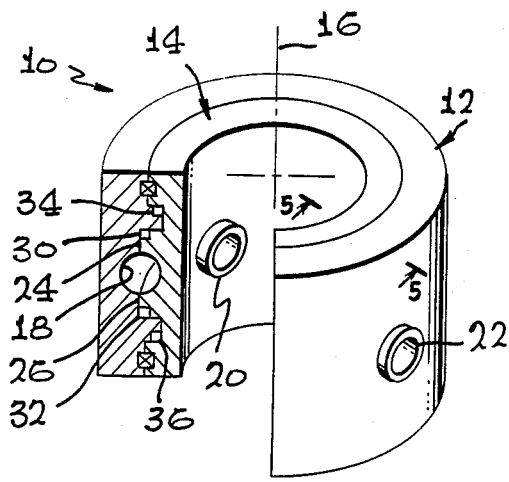
FIG. 1
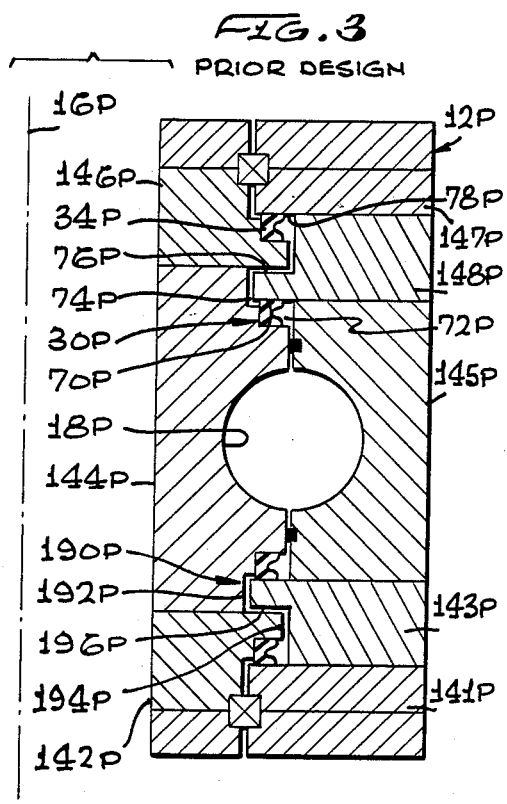
FIG. 3 PRIOR DESIGN
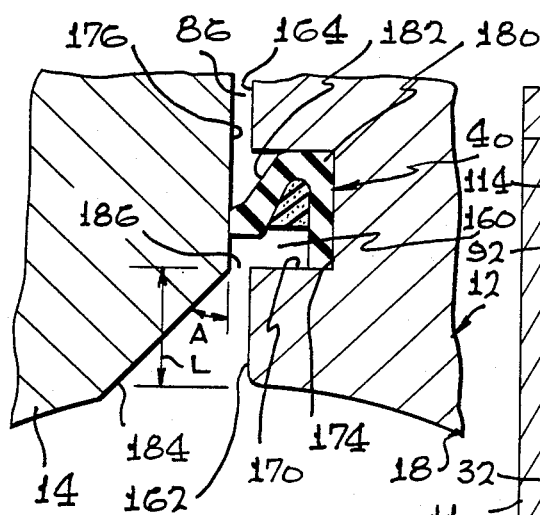
FIG. 5
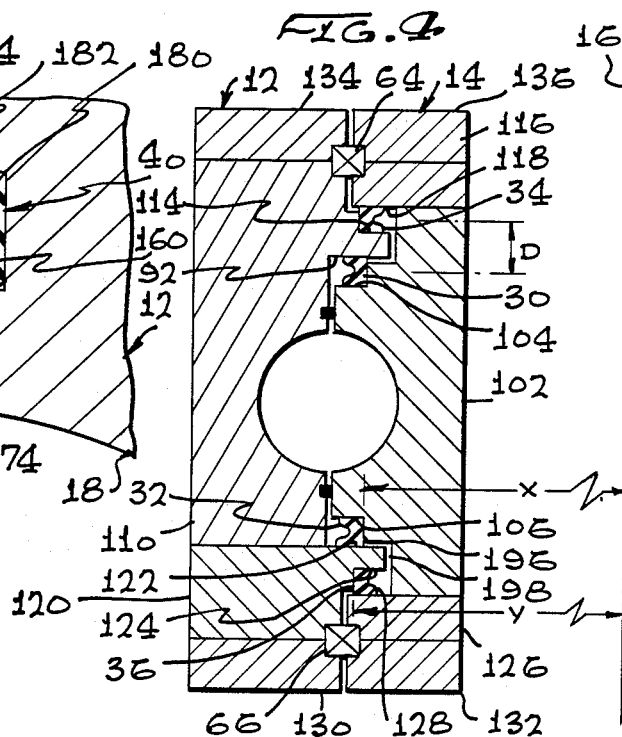
FIG. 4

FLUID SWIVEL ASSEMBLY

CROSS REFERENCE TO RELATED APPLICATION

This is a continuation-in-part of U.S. patent application Ser. No. 016,279 filed Feb. 19, 1987, which is a continuation of Ser. No. 787,388 filed Oct. 15, 1985, now U.S. Pat. No. 4,647,076 issued Mar. 3, 1987.

BACKGROUND OF THE INVENTION

Fluid swivels are commonly used in offshore installations to transfer gas and oil between a fixed underwater pipeline and a tanker that may drift around the installation. A typical fluid swivel includes ring-shaped inner and outer walls forming an annular chamber between them and forming a pair of gap passages extending from opposite sides of the chamber to the environment. A primary and second seal are placed along each gap passage, the secondary seal serving as backup in the event of failure of the primary seal. An isolation seal with substantially zero pressure difference across it, is often placed between the chamber and each primary seal, with a clean fluid lying between the isolation seal and the primary seal. This allows the primary seal, which must withstand a large pressure difference, to be bathed in clean fluid.

Some newer fluid swivel designs use axial, or face seals for the primary and secondary seals. In order that the axial forces on the inner and outer wall remain the same before and after failure of a primary seal, the primary and secondary seals are positioned the same distance from the axis of the swivel and both have high pressure ends that face in the same radial direction (either both towards the axis or both away from the axis). Such an arrangement results in a convoluted gap passage portion extending between the primary and secondary seals. The fluid swivel must be assembled by stacking the parts on one another in a predetermined sequence to account for the fact that there is radial interfernce between parts of the inner and outer wall. The convoluted gap passage results in the need for a considerable number of different parts in the fluid swivel. An increased number of parts increases the expense of the fluid swivel because of the need to form additional parts and because tighter tolerances are required where a greater number of parts are used. Fewer parts also decrease the potential leak paths in the swivel. A fluid swivel which minimized the number of separate parts would be of considerable value.

The isolation seal, which lies between the chamber and the primary seal, often experiences a shortened lifetime because of the buildup of sediment in the form of sand, pipescale, rust, etc. on the side facing the chamber. A design which minimized such buildup would also be of considerable value.

SUMMARY OF THE INVENTION

In accordance with one embodiment of the present invention, a fluid swivel is provided which is economical to construct and maintain. In a fluid swivel which includes primary and secondary axial, or face seals along each gap passage, the number of separate parts that must be assembled is reduced, and the overall height of the fluid swivel is also reduced, by minimizing the convolution of each gap passage. This can be accomplished by having the primary and secondary seals face in opposite direction, and by spacing the low pressure ends of the seals about equal distances from the axis of rotation of the fluid swivel.

The buildup of sediment on the chamber side of the isolation seal is minimized by tapering a portion of the gap passage extending between the chamber and the isolation seal. The tapered portion of the gap passage enables fluid in the chamber to circulate more freely near the isolation seal to help wash away sediment.

The novel features of the invention are set forth with particularity in the appended claims. The invention will be best understood from the following description when read in conjunction with the accompanying drawings.

BRIEF DESCRIPTION OF THE DRAWINGS

FIG. 1 is a simplified perspective and sectional view of a fluid swivel constructed in accordance with the present invention.

FIG. 3 is a sectional view of a fluid swivel of a prior design.

FIG. 4 is a simplified sectional view of the fluid swivel of FIG. 2, to aid in comparing applicant's fluid swivel with that of the prior design of FIG. 3.

FIG. 5 is a view of a portion of the swivel of FIG. 1 taken on the line 5—5 thereof, showing the isolation seal and a portion of the gap passage thereat.

DESCRIPTION OF THE PREFERRED EMBODIMENT

Figure 2:
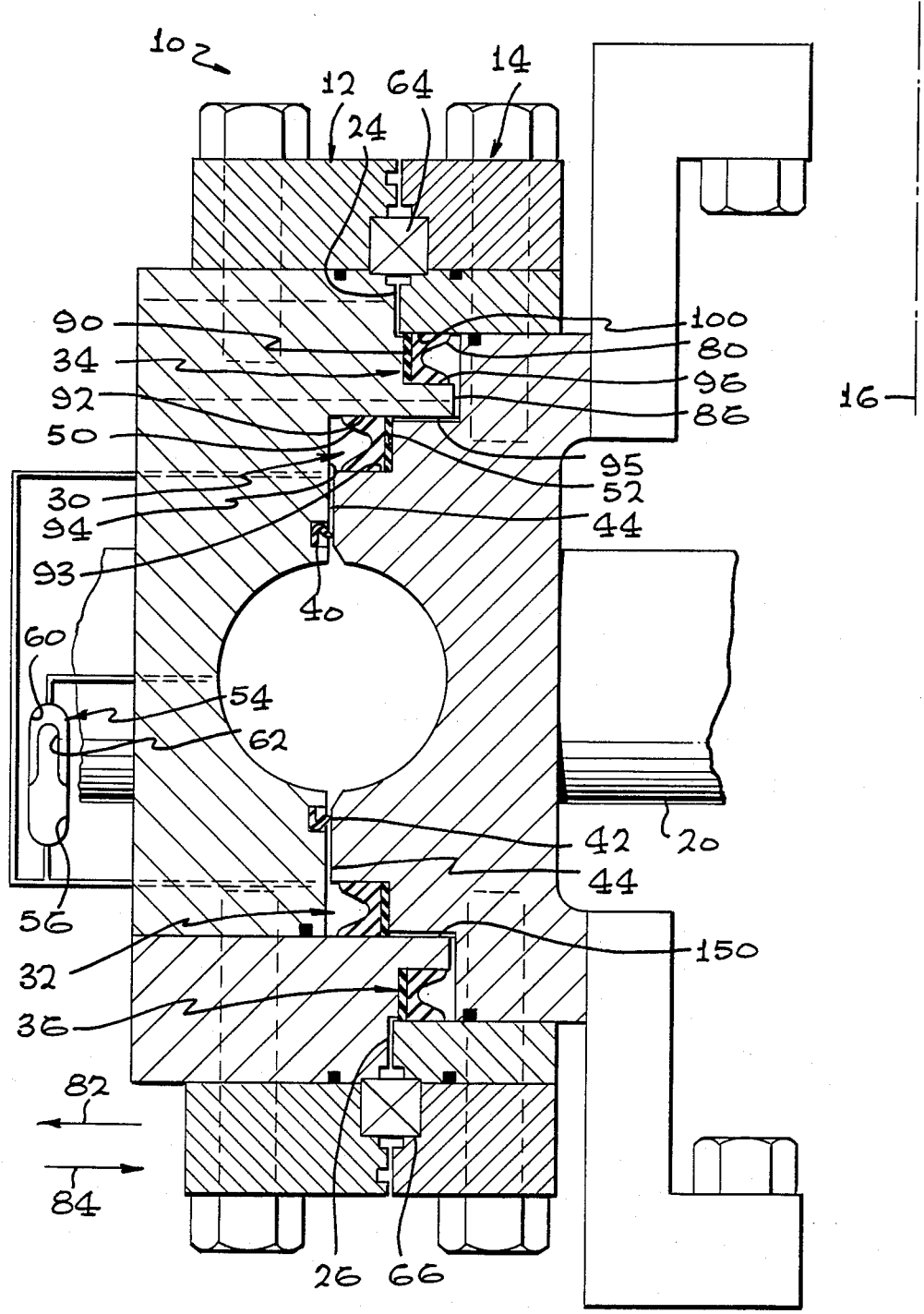
FIG. 2 is a more detailed sectional view of the fluid swivel of FIG. 1.

FIG. 1 illustrates a fluid swivel 10 which includes an outer wall 12 that can rotate relative to an inner wall 14 about a vertical axis 16. The walls form a fluid-carrying chamber 18 between them. Fluid can enter the chamber through a relatively stationary inlet pipe 20, and can exit from the chamber through an outlet pipe 22 that can rotate about the axis 16. The fluid swivel forms two gaps or gap passages, including a first or upper gap passage 24 and a second or lower one 26 between the inner and outer walls. A pair or primary seals 30, 32 lie along each gap passage to avoid the leakage of high pressure fluid from the chamber 18, along a gap passage, into the environment. A pair of secondary seals 34, 36 also lie along each gap passage to prevent the leakage of fluid into the environment in the event of failure of the corresponding primary seal. It may be noted that in some high pressure fluid swivels a large pressure drop is maintained across the secondary seal to reduce the pressure drop across the primary seal. The primary and secondary seals 30, 32, 34 and 36 which all must be capable of withstanding a large pressure difference, are face seals, or axial seals, which seal against axially-spaced surfaces on the inner and outer walls.

If the distances x, y, (FIG. 4) between the axis 16 and the low pressure ends of the primary and secondary seals 32, 36 are considerably different, then a considerable change in axial load is applied when the primary seal fails. In one example, the radius X of the fluid swivel near the chamber 18 is about 2 feet (24 inches) and fluid, in the chamber is at a pressure such as 2000 psi. If $x-y=1$ inch, then the change in axial load when the primary seal fails is $1 \times 47\pi \times 2000 = 295,000$ pounds.

As shown in FIG. 2, the fluid swivel includes upper and lower isolation seals 40, 42 between the annular chamber 18 and each primary seal 30, 32. An intermediate gap portion 44 lying between each isolation seal 40, 42 and primary seal 30, 32 contains a clean fluid at about the same pressure as fluid in the chamber 18.

The fluid in the chamber 18 may contain hydrocarbons received from an undersea well, as well as sand and corrosive chemicals, at a high pressure such as 2000 psi. The clean fluid in the intermediate gap portion 44 is of about the same pressure, such as 2000 psi, so that the isolation seals 40, 42 do not have to withstand a large pressure difference, and can have an extended life despite their contact with the adverse material in the chamber 18. The primary seal 30 must withstand a large pressure difference, such as 2000 psi, between its upstream or high pressure end 50, and its downstream or low pressure end 52 (the terms "upstream" and "downstream" refer to the direction in which fluid would flow out of the chamber 18 in the absence of seals). By subjecting the primary seal 30 to only clean fluid, it can achieve a longer lifetime of use while it withstands a large pressure difference. An apparatus 54 for applying the clean fluid, includes a pair of compartments 56, 60 separated by a membrane 62. One compartment 60 is coupled to the chamber 18 to receive the pressure in the chamber, while the other compartment 56 contains clean fluid and is coupled to the intermediate gap portions 44.

The outer and inner walls 12, 14 of the fluid swivel are rotatably coupled by a pair of bearings 64, 66 which, together must withstand both axial and radial loads. The primary axial load (on bearing 64) arises from the weight of the outer wall 12 which must be supported. To avoid additional loads due to the pressure of fluid in the fluid swivel, applicant makes the two gap passages and their seals symmetric. It is possible to purposely apply an axial load (a force parallel to axis 16) on the bearings; for example, the upper primary seal 30 can be spaced a greater distance from the axis 16 than the lower primary seal 32, so there is a net upward force on the outer wall 12 that counteracts some or all its weight.

In the event of failure of a primary seal such as 30, the entire pressure rise occurs at a secondary seal such as 34. It is generally desirable to design the fluid swivel so that in the event of failure of the primary seal the axial forces at the outer and inner walls 12, 14 remain the same as before such failure. FIG. 3 illustrates a prior design of applicant, wherein the primary and secondary seals such as 30P, 34P both faced in the same radial direction, such as away from the axis 16P, and were equally spaced from the axis. Prior to the failure of the primary seal 30P, the axial forces on the outer wall 12P, along the upper gap, were equal to the pressure of fluid in the chamber 18P times the area of the outer wall surface 70P of the hollow region 72P which contained the primary seal. In the event of failure of the primary seal, additional axial forces on the outer wall 12P were due to forces at the surfaces 74P, 76P and 78P. These forces on the surfaces 74P, 76P and 78P balance out one another so the net axial force on the outer wall 12P did not change. However, the gap portion between the primary and secondary seals was convoluted. For example, gap portion 190P includes two axially-extending legs 192P, 194P joined by a radially-extending leg 196P. Applicant's fluid swivel (FIG. 4) has a gap portion 196 with only one axially-extending leg 198. The convoluted gap portion of the prior design resulted in the need for more parts in the fluid swivel to enable its assembly and also resulted in a taller fluid swivel, as will be discussed below.

In accordance with the present invention, the present fluid swivel (FIG. 2) 10 has primary and secondary seals such as 30, 34 whose high pressure ends 50, 80 face in opposite radial directions. That is, while the high pressure end 50 of primary seal 30 faces in a first or outer radial direction 82, the high pressure end 80 of the secondary seal 34 faces in a second or inward radial direction 84. The low pressure end 90 of the secondary seal is spaced from the axis 16 by about the same distance as the low pressure end 52 of the primary seal. As discussed below, this results in substantially the same axial force being applied to the outer wall 12 after the primary seal 30 fails, as before such failure.

Prior to failure of the primary seal 30, the axial force on the outer wall 12 equals the pressure of fluid in the chamber 18 times the area of the axially-facing seal surface 92 on the outer wall which lies in the hollow region 94 that contains the primary seal 30. In the event of failure of the primary seal 30, the additional axial forces on the outer wall 12 will be due to pressure on the surface portion 95 along the connecting gap portion 86, and pressure on the surface 96 in the hollow region 100 which contains the secondary seal. The forces on the surface portions 95, 96 are substantially equal and opposite, where the low pressure end 90 of the secondary seal is spaced from the axis 16 by about the same distance as is the low pressure end 52 of the primary seal.

Thus, by approximately equal spacing of the low pressure ends of the primary and secondary seals from the axis, and by having the primary and secondary seals face in opposite radial directions (that is, their high pressure ends face in opposite radial directions), applicant is able to avoid a substantial change in axial loading of the bearings in the event of failure of a primary seal. This is achieved by using a connecting gap portion 86 which is less convoluted than previously. The difference in spacing of the low pressure ends of the seals is less than the axial length of each seal, and preferably much less than half of that. In a 4 foot diameter swivel, each pressure seal may have a radial length of about one inch, and the difference in spacing is preferably less than one inch.

The advantages of a less convoluted connecting gap portion 86 can be appreciated by considering the fact that the fluid swivel must contain several separate parts in order to enable it to be assembled. FIG. 4 is a simplified view of the fluid swivel of FIG. 2. The fluid swivel includes basically five separate parts that form the surfaces against which the primary and secondary seals press to seal against fluid leakage. A first part 102 on the inner wall forms a pair of seal surfaces 104, 106 at the primary seals 30, 32. A second part 110 on the outer wall forms seal surfaces 92, 114 at the upper primary and secondary seals 30, 34. A third part 116 of the inner wall forms a seal surface 118 at the upper secondary seal. A fourth part 120 of the outer wall forms seal surfaces 122, 124 at the lower primary and secondary seals. A fifth part 126 forms a seal surface 128 at the lower secondary seal.

Since the various parts of the inner and outer walls would have radial interference, in that parts on the inner wall extend radially outward of portions of parts on the outer wall, the parts must be assembled in a predetermined order. First, a pair of lower parts 130, 132 and the bearing 66 can be assembled with the fifth part 126, and the combination laid down. Then the fourth part 120 is laid over the fifth part 126, capturing the lower secondary seal. Next, the first part 102, with lower primary seal 32 in the groove, is laid over the fourth part 120. Next, the second part 110 is laid over the first part 102, capturing the upper primary seal 30. Finally, the third part 116 is laid over the second part 110, capturing the upper secondary seal 34. The upper bearing 64 and a pair of additional upper parts 134, 136 can be laid in place, and the parts of the inner and outer walls can be bolted together. Only five separate parts 102, 110, 116, 120 and 126 are required to form all seal surfaces at the primary and secondary seal.

The construction of FIG. 4 can be compared with the prior design of FIG. 3. In the prior design of FIG. 3, eight separate parts 141P-148P had to be used to form the eight sealing surfaces at the two primary and two secondary seals. All parts except parts 144P and 145P formed only one seal surface. Part 144P formed two seal surfaces while part 145P did not form any seal surface. The additional parts were required because of the convoluted configuration of the connecting passage portion between each primary seal and its corresponding secondary seal. In the fluid swivel of FIG. 4 most of the parts 102, 110, and 120 form two seal surfaces, while less than half of the parts 116, 126 form only one seal surface. It may also be noted that the axial or vertical distance D between each primary and corresponding secondary seal is less in the design of FIG. 4 than in the prior design of FIG. 3. Each radially jutting-out portion of a fluid swivel part has to have a certain thickness to avoid damage. The reduction in the number of parts lowers the cost of the swivel by reducing the number of separate parts that must be machined and assembled. Also, since the tolerances of a group of stacked parts may all add or subtract, the use of a fewer number of parts enables larger tolerances to be used. Some tolerances must be held fairly closely such as the width of the extrusion gap portion 150 (FIG. 2) extending radially downstream from the lower primary seal, and into which the primary seal tends to extrude. Minimizing the number of parts enables the width of the extrusion gap portion 150 to be more closely held, for a given thickness tolerance on each of the parts.

FIG. 5 illustrates some details of the isolation seal 40 which isolates the connecting gap portion 86 containing clean fluid from the chamber 18 which may contain dirty fluid. The isolation seal 40 lies in a hollow region 160 formed by a cutout in the outer wall 12 that interrupts parallel surfaces 162, 164 at one side of the gap passage. The hollow region includes first and second opposite ends 170, 172 and first and second opposite sides 174, 176. The isolation seal 40 includes a corner portion 180 that presses against the side 174 and end 172 and also includes a bridging portion 182 that extends across the gap and presses against the second side 176 of the hollow region.

The gap passage includes a tapered portion 184 extending between the chamber 18 and the upstream end of the isolation seal 40. The opposite sides of the gap along the tapered portion 184 taper at an angle A of more than 10°, with the widest end being closest to the chamber 18 and the narrowest end being closest to the isolation seal 40. Such tapering enables fluid in the chamber to circulate more freely therealong to avoid the buildup of sediment on the upstream end (the end closest to the chamber 18) of the isolation seal 40 in the hollow region 160. Sediments such as sand, pipescale, and rust tend to settle out of fluid in the chamber 18, and previously have tended to accumulate in the hollow region containing the isolation seal. By enlarging much of the gap leading to the isolation seal, fluid can circulate thereat to help wash away such sediment and minimize its buildup. The length L of the tapered portion is preferably long enough so that the narrow end 186 of the tapered portion ends at about the upstream side of the hollow region 160 containing the isolation seal. It may be noted that such a thickness of length L is present between the chamber 18 and the hollow region 160 to avoid a very thin metal part thereat along surface 162, that can easily become damaged.

Thus, the invention provides a fluid swivel that facilitates its installation and prolongs its seal lifetime. The cost and complexity of the swivel are reduced and its installation facilitated by providing primary and secondary seals positioned so that the low pressure or downstream end of the secondary seal is spaced from the axis of rotation by about the same amount as the low pressure or downstream end of the primary seal, and with the primary and secondary seals facing in opposite radial directions. This results in maintaining the same axial forces on the inner and outer walls in the event of a primary seal failure, while enabling a less convoluted connecting gap passage portion to be used between the primary and secondary seals. The less convoluted gap portion enables the use of fewer parts that can still be stacked on one another to assemble the fluid swivel, and results in a fluid swivel of smaller height. The accumulation of sediment at the isolation seal is minimized by providing a tapered gap passage portion between the chamber and the isolation seal to help wash away sediment.

Although particular embodiments of the invention have been described and illustrated herein, it is recognized that modifications and variations may readily occur to those skilled in the art and consequently it is intended to cover such modifications and equivalents.

What is claimed is:

1. In a fluid swivel which includes ring-like inner and outer walls that form a fluid-carrying chamber between them and a pair of gap passages that lead from opposite sides of the chamber, bearing means which rotatably couple the walls during rotation of one wall with respect to the other about a predetermined axis, and a pair of face seals along each gap passage with each face seal capable of withstanding a high pressure difference across itself, each pair including a primary face seal closest to the chamber and a secondary face seal further from the chamber than the primary seal, the improvement wherein:

each pair of seals includes a primary seal having a high pressure end that faces in a first radial direction with respect to said axis, and an opposite low pressure end, each pair of seals includes a secondary seal having a high pressure end that faces in a second radial direction with respect to said axis, opposite to said first direction and a low pressure end, and each gap passage includes a connecting gap portion extending between the corresponding primary and secondary seals, said seals being spaced at least partially in an axial direction;

the low pressure end of each secondary seal is spaced from said axis by a distance substantially equal to the distance of the low pressure end of the corresponding primary seal from said axis.

2. The fluid swivel described in claim 1 wherein:

each of said walls forms a seal surface at each of said face seals against which the corresponding seal presses;

said inner and outer walls each includes a plurality of parts with parts on said walls being in radial interference, whereby said parts must be stacked to assemble the swivel;

the gap passage portion extending between each primary seal and a corresponding secondary seal includes a single radially extending leg and a single axially extending leg that together occupy substantially the entire length of said gap passage portion; and a majority of said parts form a seal surface at two of said seals.

3. The fluid swivel described in claim 1 including:

an isolator seal hollow region lying along each gap passage between each primary seal and said chamber and an isolator seal lying in said isolator seal hollow region;

each gap passage including a portion extending between the chamber and the corresponding gap passage, which is tapered in width at an angle of over 10° beginning substantially at said isolator seal hollow region and extending substantially the entire distance along said gap passage to said chamber.

4. A fluid swivel comprising:

inner and outer walls, and bearing means for supporting said walls in relative rotation about an axis, said walls forming a chamber between them and at least one gap passage extending between said chamber and the environment, said gap passage forming primary and secondary hollow regions spaced at least partially in an axial direction from each other;

primary and secondary face seals lying respectively in said primary and secondary hollow regions, each seal having opposite sides sealing against axially-spaced locations respectively on said inner and outer walls, each seal having high and low pressure ends respectively closest and furthest from said chamber along said gap passage;

the high pressure ends of said seals face in opposite radial directions with respect to said axis and the low pressure ends of said seals are substantially equally spaced from said axis.

5. The swivel described in claim 4 wherein:

said gap passage includes a portion connecting said hollow regions, which includes only one leg that extends with an axial directional component.

6. In a fluid swivel which includes inner and outer walls that form a fluid-carrying chamber between them and a gap passage between them extending from said chamber, said swivel also forming a first hollow region along said gap passage containing a pressure seal and a second hollow region between said chamber and said pressure seal containing an isolation seal, the improvement wherein:

said gap passage includes a portion extending between said chamber and said isolation seal which is tapered in width, as seen in a cross-sectional view taken on a plane which includes said axis, with the widest portion of said gap passage portion lying closer to said chamber than the narrowest portion, and with the narrowest part of said tapered portion opening into said second hollow region whereby said isolation seal helps wash out sediment on the chamber side of said isolation seal.

7. The fluid swivel described in claim 6 wherein:

said gap passage forms a hollow region which holds said isolation seal, said hollow region having first and second ends respectively closest and furthest from said chamber; and said tapered gap passage portion extends from said chamber to substantially said first end of said hollow region.

8. In a fluid swivel which includes ring-like inner and outer walls that form a fluid-carrying chamber between them, and a pair of gap passages that lead from opposite sides of the chamber, bearing means which rotatably couple the walls during rotation of one wall with respect to the other about a predetermined axis, and a pair of face seals along each gap passage, each pair including a primary face seal closest to the chamber and a secondary face seal further from the chamber than the primary seal, the improvement wherein:

each pair of seals includes a primary seal having a high pressure end that faces in a first radial direction with respect to said axis and an opposite low pressure end, each pair of seals includes a secondary seal having a high pressure end that faces in a second radial direction with respect to said axis opposite to said first direction and a low pressure end, and each gap passage includes a connecting gap portion extending between the corresponding primary and secondary seals;

the low pressure end of each secondary seal is spaced from said axis by a distance substantially equal to the distance of the low pressure end of the corresponding primary seal from said axis;

said swivel forms a hollow region around each of said seals, and forms a pair of axially-spaced surfaces at each hollow region with one surface on said inner wall and the other on said outer wall, the seal in each region pressing against both surfaces thereat;

said inner and outer walls each includes a plurality of parts with parts on said inner wall extending radially outward of portions of parts on said outer wall, but said parts being stackable to form said swivel;

a first of said walls includes a first middle part (102) forming a side of said chamber and forming one of said surfaces at each primary seal;

the second of said walls including a second middle part (110) forming an opposite side of said chamber and forming one of said surfaces at the primary seals which lies along a first of said gap passages, and forming one of said surfaces at the secondary seal which lies along said first gap passage;

the first of said walls includes a third part (116) forming one of said surfaces at said secondary seal which lies along said first gap passage;

the second of said walls including a fourth part (120) which forms one of said surfaces at the primary seal which lies along said second gap passage, and which forms one of said surfaces at the secondary seal which lies along said second gap passage.

9. In a fluid swivel which includes inner end outer walls that form a fluid-carrying chamber between them and a gap passage between them extending from said chamber, said swivel also forming a first hollow region along said gap passage containing a pressure seal and a second hollow region between said chamber and said pressure seal containing an isolation seal, and means for applying a clean fluid to a portion of said gap passage which lies between said seals at a pressure about equal to the pressure of fluid in said chamber, the improvement wherein:

said gap passage includes a portion extending between said chamber and said isolation seal which is tapered in width, as seen in a cross-sectional view taken on a plane which includes said axis, with the widest portion of said gap passage portion lying closer to said chamber than the narrowest portion, and with the narrowest part of said tapered portion opening into said second hollow region, whereby said isolation seal helps wash out sediment on the chamber side of said isolation seal;

said second hollow region having first and second ends respectively closest and furthest from said chamber and first and second sides respectively formed by said first and second walls;

said isolation seal comprises a member having a corner portion lying against said first side and second end of said second hollow region, said member also having a portion extending from said second end of said second hollow region across said gap to said second side;

said gap passage includes surfaces in said first wall lying both upstream and downstream of said second hollow region and at said second side of said hollow region, which are all substantially parallel, while the surface of said first wall along said gap passage upstream of said second hollow region is angled by over 10° from parallelism with said parallel surfaces.

* * * * *